United States Patent
Lemarchand et al.

(10) Patent No.: US 10,850,859 B2
(45) Date of Patent: Dec. 1, 2020

(54) AIRCRAFT WITH A PROPULSION UNIT WITH OFFSET FAN

(71) Applicant: SAFRAN AIRCRAFT ENGINES, Paris (FR)

(72) Inventors: Kevin Morgane Lemarchand, Melun (FR); Tewfik Boudebiza, Paris (FR); Gilles Alain Charier, La Grande Paroisse (FR); Nathalie Nowakowski, Cesson (FR)

(73) Assignee: Safran Aircraft Engines, Paris (FR)

( * ) Notice: Subject to any disclaimer, the term of this patent is extended or adjusted under 35 U.S.C. 154(b) by 615 days.

(21) Appl. No.: 15/284,895

(22) Filed: Oct. 4, 2016

(65) Prior Publication Data
US 2017/0240286 A1    Aug. 24, 2017

(30) Foreign Application Priority Data

Oct. 5, 2015  (FR) ..................................... 15 59452
Nov. 16, 2015 (FR) ..................................... 15 61014

(51) Int. Cl.
*B64D 27/18*    (2006.01)
*B64D 35/04*    (2006.01)
(Continued)

(52) U.S. Cl.
CPC .............. *B64D 27/18* (2013.01); *B64C 3/182* (2013.01); *B64C 3/32* (2013.01); *B64C 11/001* (2013.01);
(Continued)

(58) Field of Classification Search
CPC ......... B64C 3/182; B64C 3/32; B64C 11/001; B64D 27/12; B64D 27/18; B64D 27/26;
(Continued)

(56) References Cited

U.S. PATENT DOCUMENTS 2,526,941 A * 10/1950 Fishbein ................ B64D 27/12
                                                          244/15
2,910,254 A * 10/1959 Razak ...................... B64C 23/00
                                                          244/208

(Continued)

FOREIGN PATENT DOCUMENTS

EP     2 096 293 A2    2/2009
FR     2 698 068 A1    5/1994
(Continued)

OTHER PUBLICATIONS

French Search Report dated Aug. 19, 2016, issued in corresponding French Application No. 1559452, filed Oct. 5, 2015, 7 pages.

*Primary Examiner* — Tien Q Dinh
*Assistant Examiner* — Brady W Frazier
(74) *Attorney, Agent, or Firm* — Christensen O'Connor Johnson Kindness PLLC

(57) ABSTRACT

An aircraft includes a wing having a first upstream spar and a second downstream spar extending in the direction of the span of said wing, and at least one propulsion unit supported by the wing. The propulsion unit includes a turboprop engine and a propeller. The propeller includes an external annular casing fixed to a suction surface of the wing, and at least to the first upstream spar via at least one first and second fastener.

13 Claims, 5 Drawing Sheets

(51) Int. Cl.
*B64C 3/18* (2006.01)
*B64C 3/32* (2006.01)
*B64C 11/00* (2006.01)
*B64D 27/12* (2006.01)
*B64D 27/26* (2006.01)
*B64D 35/02* (2006.01)
*F02K 1/54* (2006.01)
*F02K 3/077* (2006.01)

(52) U.S. Cl.
CPC ............. *B64D 27/12* (2013.01); *B64D 27/26* (2013.01); *B64D 35/02* (2013.01); *B64D 35/04* (2013.01); *F02K 1/54* (2013.01); *F02K 3/077* (2013.01); *B64D 2027/266* (2013.01); *Y02T 50/671* (2013.01)

(58) Field of Classification Search
CPC .. B64D 2027/266; B64D 35/02; B64D 35/04; B64D 35/06; B64D 35/08; F02K 1/54; F02K 3/077; Y02T 50/671
USPC .......................................................... 244/13
See application file for complete search history.

(56) References Cited

U.S. PATENT DOCUMENTS

| | | | | |
|---|---|---|---|---|
| 2,973,165 A * | 2/1961 | Davidson | ............. | B64C 23/005 244/15 |
| 3,054,577 A * | 9/1962 | Wolf | ............. | B64D 27/12 244/110 B |
| 3,089,666 A * | 5/1963 | Quenzler | ............. | B64C 9/24 244/211 |
| 3,469,803 A * | 9/1969 | Schmielau | ............. | B64C 29/0075 244/12.4 |
| 3,592,412 A * | 7/1971 | Glatfelter | ............. | B64C 29/0033 244/7 A |
| 4,171,786 A * | 10/1979 | Krenz | ............. | B64D 27/18 244/45 R |
| 4,318,516 A * | 3/1982 | Cole | ............. | B64D 27/18 244/54 |
| 4,437,627 A * | 3/1984 | Moorehead | ............. | B64D 27/18 244/110 B |
| 4,821,980 A * | 4/1989 | Clausen | ............. | B64D 27/14 244/54 |
| 5,065,959 A * | 11/1991 | Bhatia | ............. | B64D 27/14 244/54 |
| 5,085,315 A * | 2/1992 | Sambell | ............. | B64C 27/30 244/17.25 |
| 5,149,016 A * | 9/1992 | Huhn | ............. | B64D 27/02 244/12.3 |
| 7,726,602 B2 * | 6/2010 | Llamas Sandin | ...... | B64D 27/14 244/54 |
| 9,643,720 B2 * | 5/2017 | Hesselbarth | ........ | B64C 29/0033 |
| 9,878,796 B2 * | 1/2018 | Sheridan | ............. | F02C 7/36 |
| 2006/0011780 A1 * | 1/2006 | Brand | ............. | B64D 27/14 244/60 |
| 2009/0229243 A1 * | 9/2009 | Guemmer | ............. | B64D 27/12 60/226.1 |
| 2011/0180673 A1 * | 7/2011 | Lim | ............. | B64C 27/24 244/7 A |
| 2015/0275695 A1 * | 10/2015 | Evans | ............. | F01D 25/243 415/9 |
| 2015/0375860 A1 * | 12/2015 | Hong | ............. | B64D 35/00 244/12.4 |
| 2016/0010589 A1 * | 1/2016 | Rolt | ............. | F01D 13/003 60/226.1 |
| 2016/0046381 A1 * | 2/2016 | Barmichev | ............. | B64D 27/02 244/54 |
| 2016/0144967 A1 * | 5/2016 | Golshany | ............. | B64D 27/18 244/54 |

FOREIGN PATENT DOCUMENTS

| | | |
|---|---|---|
| GB | 2 203 105 A | 10/1988 |
| GB | 2 268 138 A | 1/1994 |
| WO | 2015/069147 A1 | 5/2015 |

* cited by examiner

AIRCRAFT WITH A PROPULSION UNIT WITH OFFSET FAN

FIELD OF THE INVENTION

The present invention relates to the field of aeronautical propulsion. It relates to the arrangement of the propulsion engines on an aircraft.

PRIOR ART

The natural evolution of multiflow turbojet engines is to reduce the specific thrust by increasing the bypass ratio, that is to say the ratio of the secondary flow passing through the fan or fans to the primary airflow passing through the central body with the combustion chamber and the turbines. In the case of conventional turbojet engines with a turbine directly connected to the fan, the bypass ratios are limited by the peripheral speed at the head of the fan blades. Architectures with a fan driven by means of a speed reducer—or UHBR (ultra-high bypass ratio)—respond to this problem partially by optimizing the efficiency of the turbine at a moderate fan speed.

However, an additional increase in the bypass ratio on such engines attached under the wing would be constrained by the minimum ground clearance of the aircraft to be complied with since the bypass ratio is related to the diameter of the fan. Furthermore, ever higher diameters would lead to the architecture of the power transmission being made more complex, giving rise to a not insignificant increase in mass.

A solution involving assembling a plurality of fans on offset axes, that is to say offset laterally, affords an increase in the bypass ratio while keeping a suitable ground clearance under the aircraft wing.

The use of said architectures involves a certain number of constraints to be taken into account and to be complied with. These are in particular the following constraints:

Problem related to the implementation of the thrust-reversal function.

In conventional turbojet engines, the thrust reversal is effected by opening the fan cowls and ejecting reversed air onto the external sides of the nacelle. It is not possible to eject the airflow produced downwards, at 6 o'clock, because of the proximity of the ground. It is not possible upwards, at 12 o'clock, because of the presence of the strut connecting the engine and wing. It is also impossible on the internal sides for the same reasons relating to the obstacles encountered. The absence or limitation of the thrust-reversal function increases the length of runway necessary for landing the aircraft. It is therefore necessary to land only on airports with a long runway, and the time spent on the ground by an aircraft is increased since the aircraft is further away from the boarding area, and all these consequences involve a loss of earnings for the airline.

High penalty in terms of mass of the assembly formed by the nacelle and engine suspension.

In conventional turbofans, the center of gravity of the assembly formed by the turbine engine and its suspension must be positioned between the front and rear attachments of the strut, in order not to create instability. However, when the fan or fans are offset on the sides of the gas generator, having a second fan module close to the first causes the center of gravity to be located towards the upstream end of the turbine engine/suspension assembly. This arrangement close to the upstream attachment point is a source of instability in flight. In addition, since the center of gravity is off-center with respect to the axis of the gas generator, this contributes to imposing torsional and bending moments on the strut.

Problem related to the lack of interchangeability of the fans.

In a conventional turbofan, there is no constraint with respect to symmetry. However, in the case of a multifan architecture with one fan offset laterally, an engine situated on one side cannot be moved under the wing on the opposite side of the aircraft without this impacting on the mounting of the modules.

Optimization of the saving in specific consumption.

In the context of an architecture with a single strut, torsional and flexural strain on the strut is prevented while limiting the impact of these forces on the mass of the suspension by controlling the thrusts supplied by the two fans. Eliminating this constraint would amount to adding one degree of freedom in the performance model of the propulsion unit. This would be a possible factor in a saving in specific consumption.

The objective of the present invention is to preserve the advantages of the multifan architecture while proposing a new configuration in order to respond to the problems observed, as set out above, in the case of multifans with fans offset under the wing, namely:

limitation of the thrust-reversal function;
penalties with regard to mass on the strut/suspension part because of a center of gravity too far from the wing;
risk of loss of performance with consumption of the play due to the arrangement of a center of gravity off-center from the axis of the turbine engine;
non-interchangeability of the left and right engines, producing an additional cost in production but also during maintenance;
saving in specific consumption not sufficiently favorable.

DISCLOSURE OF THE INVENTION

These objectives are achieved, in accordance with the invention, with an aircraft comprising a fuselage, two wings on either side of the fuselage, at least two propulsion units each fixed to one of the wing, the propulsion units comprising at least a turbine engine and a propeller, either the turbine engine or the propeller is fixed under the wing and the other one is fixed on top of the wing, the axis of the turbine engine and of the propeller being situated in the same vertical plane, and the propeller rotor is driven by an intermediate shaft comprising a bottom part under the wing and a top part on top of the wing, said bottom part and top part being connected to each other by a coupling.

Such a feature allows interchangeability of the propeller and the turbine engine, and transmission of movements in case of non-alignment.

Turbine engine means here a multiflow turbojet engine, in particular a dual-flow engine with a ducted fan and a gas generator that is a gas-turbine engine, the fan being disposed on the upstream side of the gas generator. It may also be turboprop engine, the fan then being an unducted propeller. It may also be a turbojet engine with a pair of contra-rotating propellers. Hereinafter the term propeller will be used but this will include single or multiple fans as well as single or multiple propellers.

According to a feature of the invention, the turbojet engine having a longitudinal axis and comprises an upstream fan. In particular, the propulsion unit comprises a propeller with an axis offset relative to the axis of the turbojet engine and the upstream fan.

According to one feature of the invention, the turbine engine is a multiflow turbojet engine or a turboprop engine.

According to one feature of the invention the propeller is ducted.

According to one feature of the invention, the turbine engine is fixed under the wing.

According to one feature of the invention, the propeller is fixed on top of the wing.

According to one feature of the invention, the turbine engine comprises at least one free-turbine stage driving said propeller.

According to one feature of the invention, the propeller is driven mechanically.

According to one feature of the invention, the turbine engine and/or propeller is equipped with a thrust reverser.

According to one feature of the invention, at least whichever of the turbine engine or propeller that is mounted on top of the wing comprises a thrust-reversal means capable of diverting the flow that passes through it at least upwards and/or laterally.

The invention also concerns an aircraft comprising at least one wing comprising a first upstream spar (longeron) and a second downstream spar (longeron) extending in a direction of the span of said wing, and at least one propulsion unit fixed to a wing, the propulsion unit comprising at least one turbine engine and one propeller, the propeller comprising an external annular casing fixed to a suction surface of the wing, and at least to the first upstream spar by at least one first and one second fasteners.

According to one feature of the invention, the external annular casing is fixed to one of the spars via a first strut.

In particular, the propeller comprises at least one movable hub, a central casing CC supporting the movable hub and a transmission mechanism, and radial arms connecting the central casing to the external annular casing.

According to one feature of the invention, the external annular casing comprises an air-inlet lip arranged upstream of a plane transverse to the leading edge of the wing.

In accordance with a preferred embodiment, either the turbine engine or the propeller is fixed under the wing and the other one is fixed on top of the wing.

In particular, the axes of the turbine engine and of the propeller are situated in the same vertical plane.

According to one feature of the invention, the turbine engine is suspended from the wing via a second strut.

In accordance with another feature, the turbine engine comprises at least one turbine stage driving the offset propeller. Preferably, the offset propeller is driven mechanically by said turbine.

In accordance with another feature, the turbine engine and/or the propeller comprises a thrust-reversing means. More particularly, at least whichever of the turbine engine or propeller that is mounted on the wing comprises a thrust-reversal means capable of diverting the flow that passes through it at least upwards and/or laterally.

Alternatively, at least the turbine engine fixed under the wing comprises a thrust-reversal means capable of diverting the airflow passing through it at least partly laterally.

DESCRIPTION OF THE DRAWINGS

The invention will be better understood, and other aims, details, features and advantages thereof will emerge more clearly upon reading the detailed explanatory description that follows of embodiments of the invention given by way of purely illustrative and non-limitative examples, with reference to the accompanying schematic drawings.

DETAILED DESCRIPTION

Figure 1:
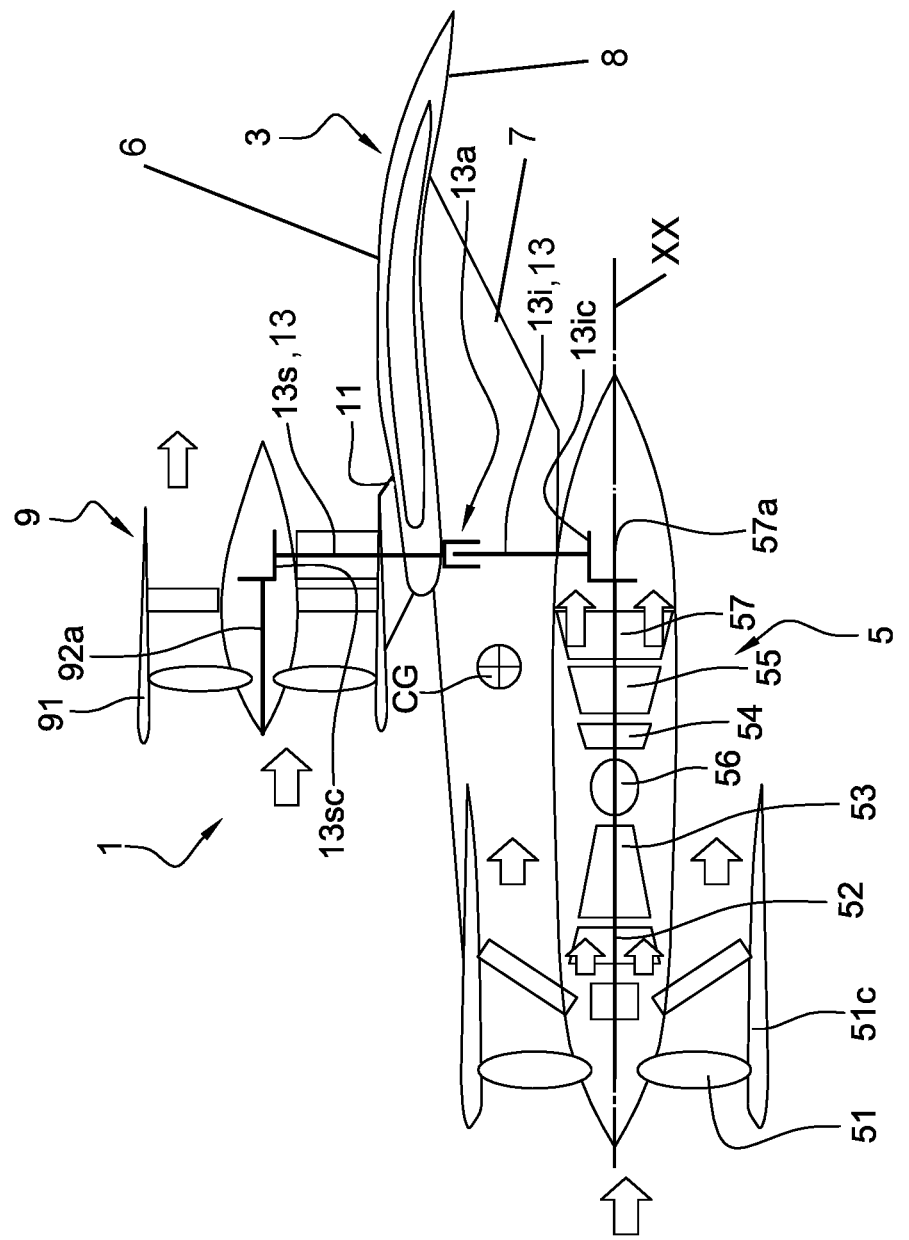
FIG. 1 depicts schematically in axial section an example of an architecture of an engine connected to the wing of an aircraft, in accordance with the invention.

With reference to FIG. 1, the propulsion unit 1 is shown mounted on the wing 3 or lateral lift wing of an aircraft. The aircraft comprises at least two such propulsion units, one on each wing. Each wing comprises, in a known fashion, a first upstream structural spar L1 (shown in FIG. 4) and a second downstream structural spar L2 (shown in FIG. 4) extending from a fuselage in a wingspan direction. Each wing 3 comprises a top so-called suction surface 6 and an opposite bottom so-called pressure surface 8, which are connected to each other by an upstream leading edge and a downstream trailing edge of the wing 3.

The propulsion unit comprises a turbojet engine 5 having an axis XX suspended from a strut 7 under the wing in front with respect to the leading edge of the wing. The turbojet engine 5 comprises, according to this embodiment, an upstream fan 51, upstream being defined with respect to the direction of movement of the aircraft in flight. The fan is ducted by means of a casing 51C. Downstream of the fan is the gas generator formed here by a dual-body gas turbine engine: a low-pressure body LP, formed by a compressor 52 and a turbine 53, and a high-pressure body HP, coaxial with the body LP, with a compressor 54 and a turbine 55. A combustion chamber 56 is supplied by the compressed air coming from the compressors 52 and 54 in series. The gases produced in the combustion chamber 56 successively move the HP turbine 55 and LP turbine 53, which respectively drive the two compressors, HP 54 and LP 52. The LP turbine drives the ducted fan 51 directly or by means of a suitable reduction gear. The secondary channel downstream of the fan 51 is, according to this embodiment, shorter than the channel of the primary flow. The secondary flow and the primary flow, said primary flow forming the gases produced by the combustion chamber, are separated, and the two flows are ejected into the atmosphere through separate concentric nozzles. The turbojet engine could however have mixed flows, the two flows being mixed upstream of the gas-exhaust nozzle.

Downstream of the LP turbine 55, the gases of the primary flow drive a free turbine. This turbine 57 rotates a shaft 57a.

The propulsion unit comprises, according to the invention, a propeller. According to the embodiment shown, it is a fan 9 having an axis YY, with its casing 91. In particular, the fan comprises a plurality of movable fan blades 93 that are mounted on and extend radially from the fan shaft 92 rotating with respect to the casing 91. The casing 91 has a roughly cylindrical shape. The casing 91, which is annular and external here, also comprises an internal hub 94 through which the fan shaft 92 having an axis YY and a shell defining an annular airflow path providing the propulsion force pass. The hub and shell are connected by stator vanes known by the term guide vane assemblies or outlet guide vanes (OGVs) 95 for guiding the cold flow generated by the fan 51 flowing in the annular flow path. At least some of these stator vanes have a mechanically structuring effect and provide the transmission of the mechanical loads between the external annular casing 91 and the hub 94. The mechanical strength of the whole of the fan is also provided by a plurality of radial arms disposed downstream of the stator vanes that connect the hub to the transmission mechanism housed in the external annular casing 91.

The fan is mounted on the wing, in particular on the suction surface 6 by means of a strut 11 or any other equivalent structure forming a support for the fan on the wing. The fan may stand up above the wing or be level with the wing depending on the aerodynamic conditions sought. The axis of the fan 9 is substantially parallel to that of the turbojet engine 5.

Figure 4:
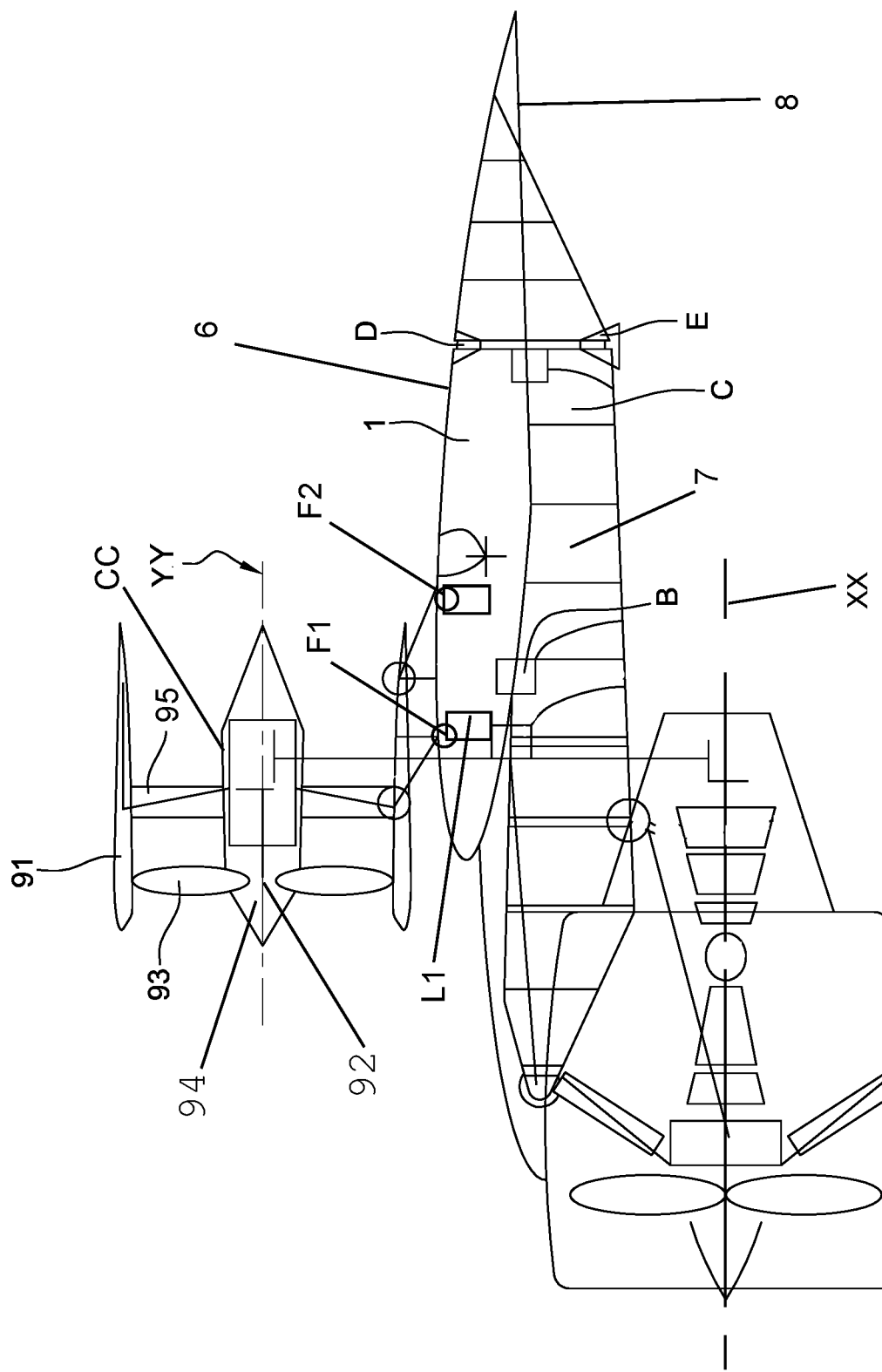
FIG. 4 shows a variant of the mounting in accordance with the invention.
Figure 5:
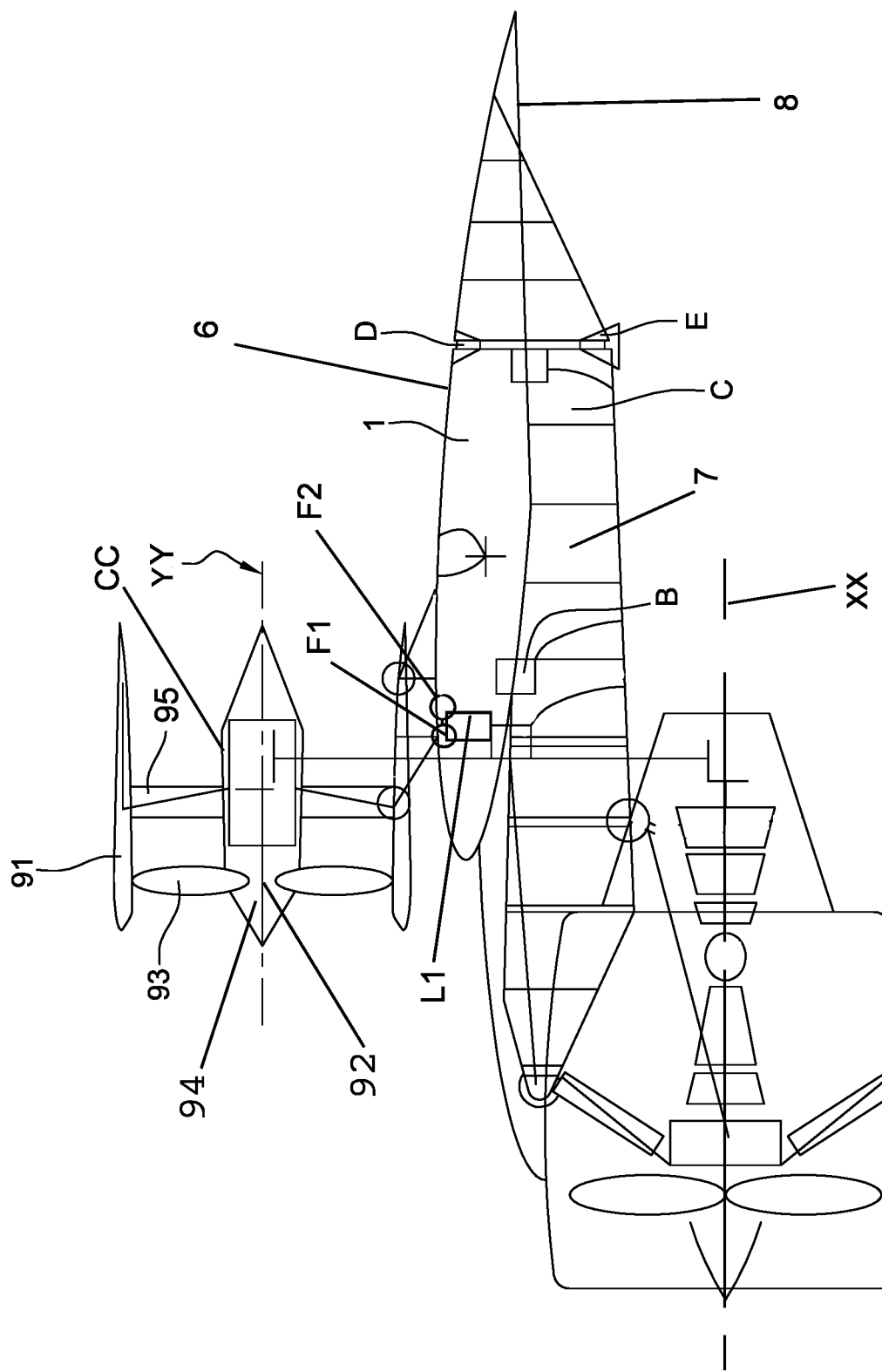

In the example where the fan 9 is level with the wing, or even integrated in the wing as illustrated in FIG. 4, the propulsion unit comprises suspension means comprising a first upstream fastener F1 and a second downstream fastener F2 that are both connected to the external annular casing 91. The first and second fasteners are also connected to the first upstream spar of the wing.

Alternatively, the first fastener is connected to the first upstream spar and the second fastener is connected to the second downstream spar.

The fasteners may be fixed to the spar directly or via a strut.

The turbine engine may also be arranged by means of two fasteners to the upstream spar or alternatively an upstream fastener to the upstream spar and a fastener to the downstream spar.

According to this representation, the rotational plane of the fan is upstream of the leading edge of the wing 3. More precisely, the external annular casing 91 comprises an air-inlet lip arranged upstream of a plane transverse to the leading edge of the wing 3.

The fan rotor is rotated by an intermediate shaft 13. The latter is, in this example, produced in two parts, a bottom part 13*i* under the wing and a top part 13*s*. The two parts are connected to each other by a suitable coupling 13*a*. This coupling enables the two parts of the intermediate shaft to be dismantled. It also makes it possible to provide the transmission of movement in the case of non-alignment resulting from deformations in the structure that are liable to occur in flight. The bottom part 13*i* of the intermediate shaft is rotated by the output shaft 57*a* of the free turbine 57 through a conical intermediate gear 13*ic*. At the other end the top part 13*s* meshes with the drive shaft 92*a* of the fan 9 by means of a conical gear 13*sc*.

In operation, the turbine engine 5 formed by the turbojet engine supplies part of the thrust on the aircraft by means of the whole of the primary and secondary flows that are produced. The free turbine 57 rotates the rotor of the fan 9 by means of the intermediate shaft 13, thus supplying another part of the thrust.

Compared with an arrangement from the prior art in which the offset fan would be at the same axial level as the fan 51 of the turbojet engine, the center of gravity CG of the propulsion unit is offset in the downstream direction since the offset fan 9 is downstream with respect to the fan 51. This arrangement is favorable in terms of stability in flight.

Figure 2:
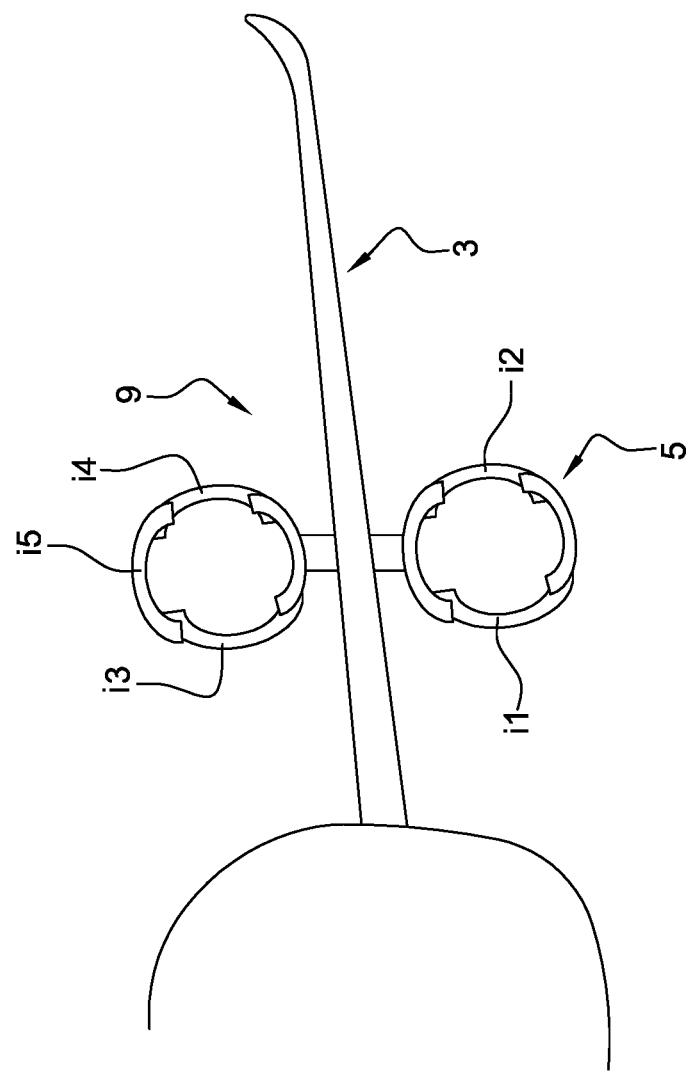
FIG. 2 is a schematic view of a mounting seen in front view.

FIG. 2 shows the arrangement of the propulsion unit. The axes of the turbojet engine 5 and fan 9 are advantageously parallel to each other and in the same vertical plane, which is favorable from the point of view of stability in flight since the thrust forces are in the same vertical plane. This is also favorable in the unintended case of just one thrust reverser, either on the under-wing propeller or on the over-wing propeller, being activated without the other. In such a case, the strut would be subjected to lower forces compared with a configuration with two propellers offset laterally under the wings.

It is also observed that, through this means, the bypass ratio is increased compared with that of the turbojet engine but without the ground clearance having been impacted.

An aerodynamic fairing can be arranged so as to increase the aerodynamic performance of the propulsion unit. In particular, this fairing could be connected to the skin of the wings and enclose the upstream and downstream spars and the strut or struts. The fairing may comprise a first fairing part intended to cover the nose of the strut or struts and a second fairing part connecting the suction surface of the wings to the external annular casing 91 of the fan. The second fairing part may advantageously terminate towards the downstream end of the strut while being connected to a distal pointed part connecting the first fairing part and the trailing edge. The second fairing part may also form, at the top part, a bracket of the upstream portion of the casing 91 of the fan so as to provide an aerodynamic connection.

The second fairing part can be fixed to the downstream end of the strut by end ribs bolted onto longitudinal ribs of the downstream spar. The fixing may be reinforced by rivets or bolts passing through the strut and entering openings provided in the second fairing portion. The distal part of the fairing may be fixed by the nesting of ribs bolted therebetween.

Alternatively, the annular fan casing and the casing of the turbojet engine may be fixed to the same strut having a unitary or compound structure, so as to balance the thrusts with respect to the wings about the torsion axis thereof and thus to give an advantageous position to the thrust center with respect to the drag center. The balancing of the weights with respect to the torsion axis is also very favorable to the stability of the propulsion unit and reduces fatigue on the wing. In addition, the propulsion unit is placed at an optimum distance with respect to the axis of the fuselage, over a significant length of the wings. Moreover, the bending moment of the wings related to the weight of the fans and of the turbojet engine can be reduced compared with a conventional arrangement where the fans and turbojet engine are staggered along the wings.

Placing the fan and turbine engine one above the other in the vertical plane facilitates their mounting and reduces the yawing movements caused by fans and turbine engines separated from each other along the wing, in particular in the case of failure of either the fan or turbine engine. The surface area necessary for the rudder or its deflection angle is thus limited.

The propulsion unit with the turbine engine and fan disposed vertically can advantageously replace a conventional propulsion unit. This allows various choices of fan and/or turbine engine. The dimensions of the casings can be reduced. Because of this, the free space on the ground with respect to the bottom part of the turbine engine is made less critical, which makes it possible to equip the aircraft with a shorter and lighter landing gear with consequently easier access to the cabin and holds.

In the case where the fan and turbine engine are disposed on the same strut, said strut may be in a single piece. Alternatively, it may be in a plurality of parts. In the case where the strut is in a single piece, the bottom part of the strut is fixed at a point substantially situated vertically in line with the downstream spar. In the case of a strut in a plurality of parts, for example two parts, the strut comprises two front and rear beams, and the rear beam is also attached at a point situated at the rear bottom part of the front beam.

The fan and turbine engine may be fixed to the same strut at two attachment points with regard to the turbine engine, such as in the middle part of the wing and upstream of the strut and at two attachment points for the fan.

The strut in a single piece or in two assembled parts preferably consists of a ribbed beam.

In a particular embodiment that is not shown, the strut may be formed by assembling a front bottom beam and a rear rising beam, and each beam may comprise a ribbed profiled web respectively with a rectangular cross section, provided with regularly staggered ribs and reinforcement ribs. The webs may each be covered by covers and are bordered laterally by plates which preferably have reinforcement ribs on their internal face.

The front beam may comprise, in a known fashion, a triangular nose in a region at the front of the strut. It has moreover a hump-back profile in the region where the turbine engine is attached to the wing box and the rear face of the web may be situated substantially in the plane of the rear face of the wing box.

With reference to FIG. 4, at the fixing point B, the cover of the webs of the beam has an orifice for a peg fixed to the face of the box.

Finally, at the point C, the face of the bottom beam carries a lug, on either side of which there are mounted two V-shaped links articulated to a double lug fixed to the rear face of the box. The double lug is preferably provided at the base of a double fork, the arms of which are fixed over the entire height of the face of the wing box and grip it. This connection system makes it possible to absorb all the forces to which the connection between the bottom beam and the chamber may be subjected under the various operating conditions of the aircraft.

The mutual fixing together of the beams and the box at the faces of these parts is supplemented as follows: at the fixing point D, the top parts of the faces each carry a double flange with two lugs respectively, connected by vertical links. The connection is supplemented by an oblique horizontal link disposed between two lugs.

At the bottom part, in the vicinity of the point E, the fixing is provided by a flange provided at the bottom with a face in which a lug fixed to the base of one face of the beam is fixed. The fixing means thus provided confer on the assembly all the rigidity and security that may be desired.

Referring back to FIG. 2, another advantage of the solution is that the thrust-reversal doors may be provided in five sectors without there being a risk of interference of the reversed flows with a surface of the aircraft. At i1 or i2 the two sectors are lateral and make it possible to generate reversed flows, free from interference with the fuselage, the wing or the ground. In particular, the thrust-reversal doors are installed on either side of the vertical plane passing through the axis of the turbojet engine and in accordance with an angular sector of between +60° and −60° with respect to a horizontal plane perpendicular to the vertical plane and between 120° and −120° with respect to the horizontal plane, considering that the perimeter of the annular casing forms a circle. The portion of perimeter where reversal doors can be integrated is maximized.

It is also possible to provide the thrust reversers on the fan 9. Here three orientations are possible: two lateral, i3 and i4, and one, i5, upwards. Adding an additional sector i5 compared with a conventional underwing fan provides a gain in efficacy of the thrust reversal. Advantageously, but in a non-limiting manner, the thrust-reversal doors are installed in accordance with an angular sector of between −60° and −120° with respect to the horizontal plane perpendicular to the vertical plane passing through the axis of the turbojet engine.

The invention is not limited to this embodiment. The turbojet engine may be another turbine engine such as a turboprop engine with a propeller in place of the fan 51, or the fan 9 may be replaced by a propeller.

Figure 3:
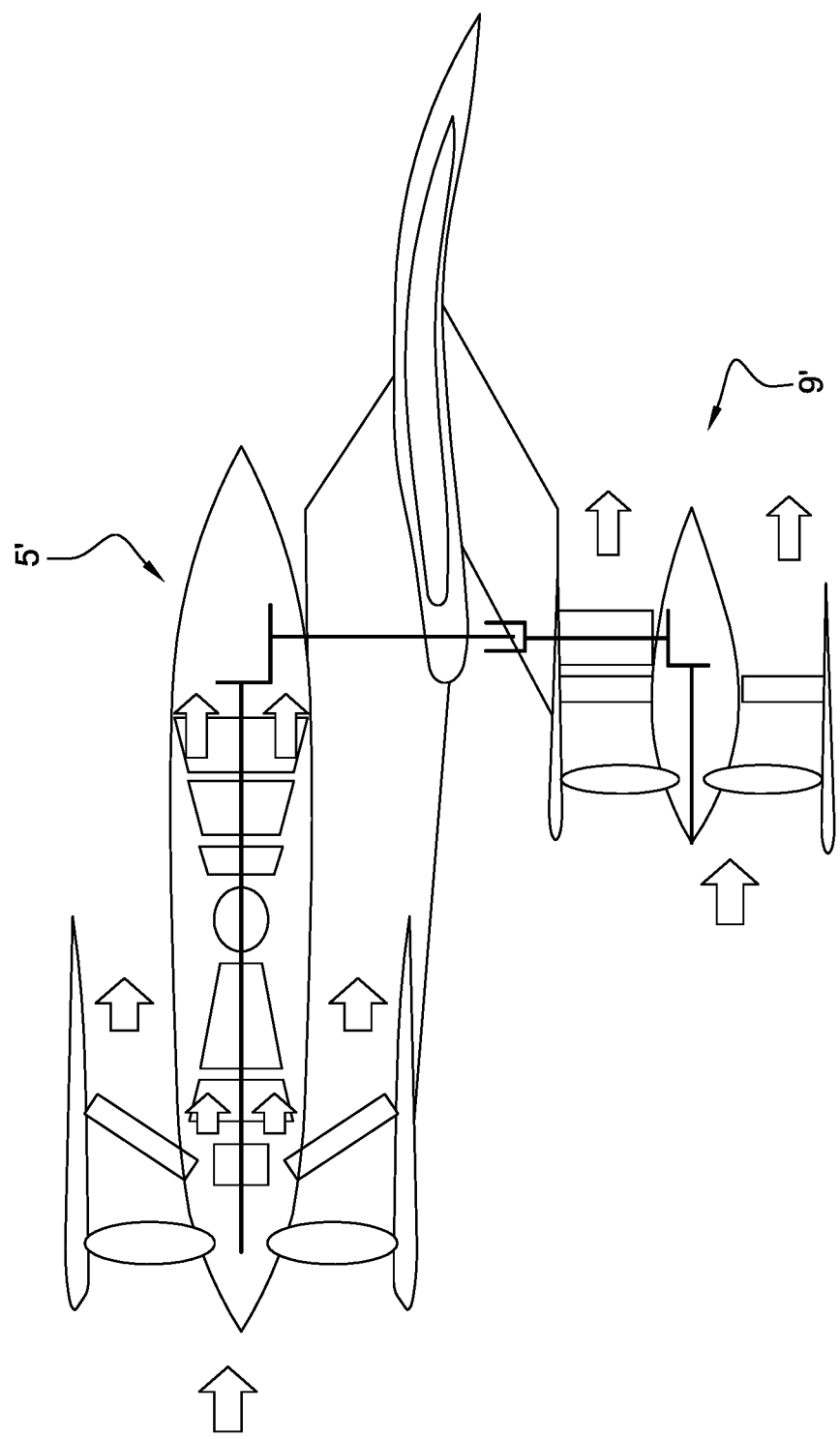
FIG. 3 shows a variant of the mounting in accordance with the invention.

FIG. 3 shows a variant where the arrangement of the turbine engine 5' is on the wing whereas that of the fan 9' is under the wing. The same elements are found as in the embodiment in FIG. 1 but reversed with respect to the wing 3. In this example, the external annular casing of the fan may be directly connected to the upstream and downstream spars of the wing or supported by the strut. The air inlet of the external annular casing 91 is arranged upstream of the plane transverse to the leading edge of the wing 3. The transmission mechanism connects the offset fan to the turbine engine disposed on the suction surface of the wing.

While illustrative embodiments have been illustrated and described, it will be appreciated that various changes can be made therein without departing from the spirit and scope of the invention.

The embodiments of the invention in which an exclusive property or privilege is claimed are defined as follows:

1. An aircraft comprising:
   a wing comprising a first upstream spar and a second downstream spar extending in a direction of the span of said wing, and
   at least one propulsion unit supported by the wing, the propulsion unit comprising a turbine engine and a propeller,
   wherein the turbine engine extends along a first axis and comprises a fan and a gas generator arranged downstream of the fan,
   wherein the propeller extends along a second axis and comprises a plurality of fan blades surrounded by an external annular casing, wherein the external annular casing is fixed to the first upstream spar via at least a first fastener, and the second axis is distinct from the first axis,
   wherein the external annular casing comprises an air-inlet lip arranged upstream of a plane transverse to the leading edge of the wing.

2. The aircraft according to claim 1, wherein the external annular casing is fixed to the downstream spar via a second fastener.

3. The aircraft according to claim 1, wherein the external annular casing is fixed to one of the spars via a first strut.

4. The aircraft according to claim 1, wherein the propeller comprises at least one movable hub, a central casing supporting the movable hub, and radial arms connecting the central casing to the external annular casing.

5. The aircraft according to claim 1, wherein either the turbine engine or the propeller is fixed under the wing and the other one is fixed on top of the wing, the first axis of the turbine engine and the second axis of the propeller being situated in the same vertical plane.

6. The aircraft according to claim 5, wherein the turbine engine is suspended from the wing via a second strut.

7. The aircraft according to claim 1, wherein the turbine engine is a multiflow turbojet engine or a turboprop engine.

8. The aircraft according to claim 1, wherein the turbine engine comprises at least one free-turbine stage driving said propeller.

9. The aircraft according to claim 1, wherein the turbine engine and/or propeller is equipped with a thrust reverser.

10. An aircraft comprising:

a wing comprising a first upstream spar and a second downstream spar extending in a direction of the span of said wing, and at least one propulsion unit supported by the wing, the propulsion unit comprising a turbine engine and a propeller, the turbine engine and propeller extending along a first and second axis, respectively, wherein the propeller comprises a plurality of fan blades surrounded by an external annular casing, wherein the external annular casing is fixed to the first upstream spar via at least one of a first fastener and a second fastener, wherein either the turbine engine or the propeller is fixed under the wing and the other one is fixed on top of the wing, the first axis of the turbine engine and the second axis of the propeller being situated in the same vertical plane, wherein the external annular casing comprises an air-inlet lip arranged upstream of a plane transverse to the leading edge of the wing.

11. An aircraft comprising:

a wing comprising a first upstream spar and a second downstream spar extending in a direction of the span of said wing, and at least one propulsion unit supported by the wing, the propulsion unit comprising a turbine engine and a propeller, wherein the propeller comprises a plurality of fan blades surrounded by an external annular casing, wherein the external annular casing is fixed to the first upstream spar via at least one of a first fastener and a second fastener, wherein the turbine engine comprises at least one free-turbine stage driving said propeller, wherein the external annular casing comprises an air-inlet lip arranged upstream of a plane transverse to the leading edge of the wing.

12. The aircraft according to claim 1, wherein the external annular casing is fixed to the first upstream spar via the first fastener and a second fastener.

13. The aircraft according to claim 1, wherein the fan is surrounded by a casing which is distinct from external annular casing of the propeller.

\* \* \* \* \*